(12) United States Patent
Kang et al.

(10) Patent No.: US 9,154,943 B2
(45) Date of Patent: Oct. 6, 2015

(54) METHOD AND APPARATUS FOR TRANSMITTING A SIGNAL IN A MULTI-NODE SYSTEM

(75) Inventors: Ji Won Kang, Anyang-si (KR); Jin Young Chun, Anyang-si (KR); Su Nam Kim, Anyang-si (KR); Bin Chul Ihm, Anyang-si (KR); Sung Ho Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 130 days.

(21) Appl. No.: 13/882,122

(22) PCT Filed: Oct. 26, 2011

(86) PCT No.: PCT/KR2011/008012
§ 371 (c)(1),
(2), (4) Date: Apr. 26, 2013

(87) PCT Pub. No.: WO2012/057513
PCT Pub. Date: May 3, 2012

(65) Prior Publication Data
US 2013/0223350 A1    Aug. 29, 2013

Related U.S. Application Data

(60) Provisional application No. 61/407,019, filed on Oct. 27, 2010.

(51) Int. Cl.
*H04W 4/00* (2009.01)
*H04L 12/50* (2006.01)
(Continued)

(52) U.S. Cl.
CPC .............. *H04W 8/245* (2013.01); *H04B 7/024* (2013.01); *H04B 7/068* (2013.01); *H04W 48/08* (2013.01)

(58) Field of Classification Search
CPC ...................................................... H04W 8/245
USPC ........................................................... 370/328
See application file for complete search history.

(56) References Cited

U.S. PATENT DOCUMENTS 6,496,505 B2 * 12/2002 La Porta et al. ............... 370/392
7,903,593 B2 *  3/2011 Fuchs et al. ................... 370/310
(Continued)

OTHER PUBLICATIONS

"3rd Generation Partnership Project; Technical Specification Group Radio Access Network; Evolved Universal Terrestrial Radio Access (E-UTRA); Futher advancemnets for E-UTRA physical layer aspects (Release 9)" 3GPP TR 36.814 V9.0.0 (Mar. 2010).

(Continued)

*Primary Examiner* — Gerald Smarth
(74) *Attorney, Agent, or Firm* — Birch, Stewart, Kolasch & Birch, LLP (57) ABSTRACT

Provided is a method for transmitting a signal in a multi-node system including a plurality of nodes, and a base station connected to each of the plurality of nodes for controlling the nodes. The method comprises the following steps: transmitting first node-setting information to a first terminal; transmitting second node-setting information to a second terminal; transmitting a signal to the first terminal through a first node group; and transmitting a signal to the second terminal through a second node group, wherein the first node-setting information and the second node-setting information include system parameters which are set differently for each terminal, and the first node group is determined on the basis of the first node-setting information, and the second node group is determined on the basis of the second node-setting information.

12 Claims, 10 Drawing Sheets

(51) Int. Cl.
*H04W 8/24* (2009.01)
*H04W 48/08* (2009.01)
*H04B 7/02* (2006.01)
*H04B 7/06* (2006.01)

(56) References Cited

U.S. PATENT DOCUMENTS

| | | | |
|---|---|---|---|
| 8,289,883 B2 * | 10/2012 | Zhu et al. | 370/255 |
| 8,315,259 B2 * | 11/2012 | Kojima | 370/390 |
| 2004/0008722 A1 * | 1/2004 | Ellis et al. | 370/461 |
| 2005/0088992 A1 | 4/2005 | Bolin et al. | |
| 2007/0162575 A1 | 7/2007 | Piercy et al. | |
| 2011/0075748 A1 * | 3/2011 | Novak et al. | 375/260 |
| 2012/0100851 A1 * | 4/2012 | Zheng et al. | 455/436 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 9)" 3GPP TS 36.331 V9.4.0 (Sep. 2010).

LG Electronics, "Physical cell ID allocation to the aggregated component carriers", 3GPP TSG RAN WG1 #57bis, R1-092875, Jun. 29-Jul. 3, 2009.

"Discussion on the physical layer measurements in distributed antenna scenario for 1.28Mcps TDD", 3GPP TSG RAN WG1 Meeting #62, Aug. 23-27, 2010, R1-104723, ZTE, pp. 1-7.

* cited by examiner

METHOD AND APPARATUS FOR TRANSMITTING A SIGNAL IN A MULTI-NODE SYSTEM

CROSS REFERENCE TO RELATED APPLICATIONS

This application is the National Phase of PCT/KR2011/008012 filed on Oct. 26, 2011, which claims priority under 35 U.S.C. 119(e) to U.S. Provisional Application No. 61/407,019 filed on Oct. 27, 2010, all of which are hereby expressly incorporated by reference into the present application.

TECHNICAL FIELD

The present invention relates to wireless communications, and more specifically, to methods and apparatuses for transmitting signals in multi-node systems.

BACKGROUND ART

In recent years, the amount of data transmitted over a wireless communication network is being increased quickly as various devices such as smart phones or tablet PCs requiring machine-to-machine (M2M) communication and high data transmission appear and spread. To meet a high amount of data transmission as required, technologies for efficiently using a broader frequency band such as carrier aggregation (CA) and cognitive radio (CR) and multi-antenna and multi-base station cooperative transmission technologies for raising data capacity in a limited frequency band are gaining more popularity.

Wireless communication networks are being evolved towards higher density of nodes that may access users' surroundings. Here, the 'nodes' physically mean antennas or antenna groups spaced apart from each other at a predetermined distance in the distributed antenna system (DAS) but are not limited thereto while being instead expanded to a broader meaning. In other words, a node may be a picocell base station (PeNB), a home base station (HeNB), an RRH (Remote Radio Head), an RRU (Remote Radio Unit), a relay station, or a distributed antenna (group).

A wireless communication system having a higher density of nodes may show higher system performance thanks to inter-node cooperation. That is, rather than operating as an independent base station without cooperation, when managed in transmission/reception by one control station to operate as an antenna or antenna group in a cell, each node may show more excellent system performance. Hereinafter, the wireless communication system including plural nodes is referred to as a multi-node system.

In this multi-node system, as the nodes are distributed arranged or according to transmission power of each node or whether there is an obstacle, the channel status between each node and a terminal may be sharply varied. For example, eight nodes may be controlled by a base station, and each node may have one transmission antenna. In such multi-node system, the eight nodes may be distributed and arranged to be spaced apart from each other at a predetermined distance. At this case, according to the position of the terminal, only four nodes may show a channel status of a predetermined value or more while the remaining four nodes may show a channel status of less than the specific value.

There is a need for a signal transmission method and apparatus considering the characteristics of the multi-node system.

DISCLOSURE

Technical Problem

There are provided a signal transmission method and apparatus in a multi-node system.

Technical Solution

According to an aspect of the present invention, a method of transmitting a signal in a multi-node system including a plurality of nodes and a base station connected to each of the plurality of nodes and controlling the plurality of nodes is provided. The method comprises: transmitting first node configuration information to a first terminal; transmitting second node configuration information to a second terminal; transmitting a signal to the first terminal through a first node group; and transmitting a signal to a second terminal through a second node group, wherein the first node configuration information and the second node configuration information include system parameters set to be different from each other according to a terminal, and wherein the first node group is determined based on the first node configuration information, and the second node group is determined based on the second node configuration information.

In the aforementioned aspect of the present invention, the first node group and the second node group may use the same cell ID.

In addition, the first node configuration information may include at least one of fields applicable to the first terminal, the fields respectively indicating the number of nodes, the number of transmission antennas per node, transmission power per node, and mapping information between a node and a reference signal.

In addition, the second node configuration information may include at least one of fields applicable to the second terminal, the fields respectively indicating the number of nodes, the number of transmission antennas per node, transmission power per node, and mapping information between a node and a reference signal.

In addition, the first terminal and the second terminal may have group IDs (Identifications) or class IDs different from each other, and the class IDs may be set differently depending on a quality of service required by the first terminal and the second terminal.

In addition, the first node configuration information and the second node configuration information may be masked with the group IDs or class IDs of the first and second terminals and transmitted.

According to another aspect of the present invention, a method of transmitting a signal in a multi-node system including a plurality of nodes and a base station connected to each of the plurality of nodes and controlling the plurality of nodes is provided. The method comprises: transmitting common node configuration information to a first terminal and a second terminal; transmitting a signal to the first terminal and the second terminal through a common node indicated by the common node configuration information; transmitting first additional node configuration information to the first terminal; and transmitting a signal to the first terminal through the common node and an additional node indicated the first additional node configuration information.

In the aforementioned aspect of the present invention, the common node may be a node transmitting a signal necessary for the first terminal and the second terminal to enter or re-enter into a cell.

In addition, the common nodes may be some of the plurality of nodes.

In addition, the first additional node configuration information may include a bitmap indicating a node that is added to the first terminal among the plurality of nodes.

In addition, the common node configuration information may be transmitted through a broadcast channel.

In addition, the first additional node configuration information may be unicast to the first terminal.

In addition, the first terminal and the second terminal may have group IDs (Identifications) or class IDs different from each other, and the class IDs may be set differently depending on a quality of service required by the first terminal and the second terminal.

In addition, the first additional node configuration information may be masked with a terminal group ID or class ID of the first terminal and transmitted.

Advantageous Effects

In the multi-node system, the optimal node configuration may apply according to the service required by the terminal group or terminal. Accordingly, the efficiency of the multi-node system may be increased.

MODE FOR INVENTION

The technologies described below may be used in various multiple access schemes such as CDMA (code division multiple access), FDMA (frequency division multiple access), TDMA (time division multiple access), OFDMA (orthogonal frequency division multiple access), or SC-FDMA (single carrier-frequency division multiple access). CDMA may be implemented in radio technologies such as UTRA (Universal Terrestrial Radio Access) or CDMA2000. TDMA may be implemented in radio technologies such as GSM (Global System for Mobile communications)/GPRS (General Packet Radio Service)/EDGE (Enhanced Data Rates for GSM Evolution). OFDMA may be implemented in radio technologies such as IEEE (Institute of Electrical and Electronics Engineers) 802.11 (Wi-Fi), IEEE 802.16 (WiMAX), IEEE 802.20, E-UTRA (Evolved UTRA). UTRA is part of UMTS (Universal Mobile Telecommunications System). 3GPP (3rd Generation Partnership Project) LTE (Long Term Evolution) is part of E-UMTS (Evolved UMTS) using E-UTRA and adopts OFDMA for downlink and SC-FDMA for uplink. LTE-A (Advanced) is a subsequent system of LTE. IEEE 802.16m is a subsequent system of IEEE 802.16e.

Figure 1:
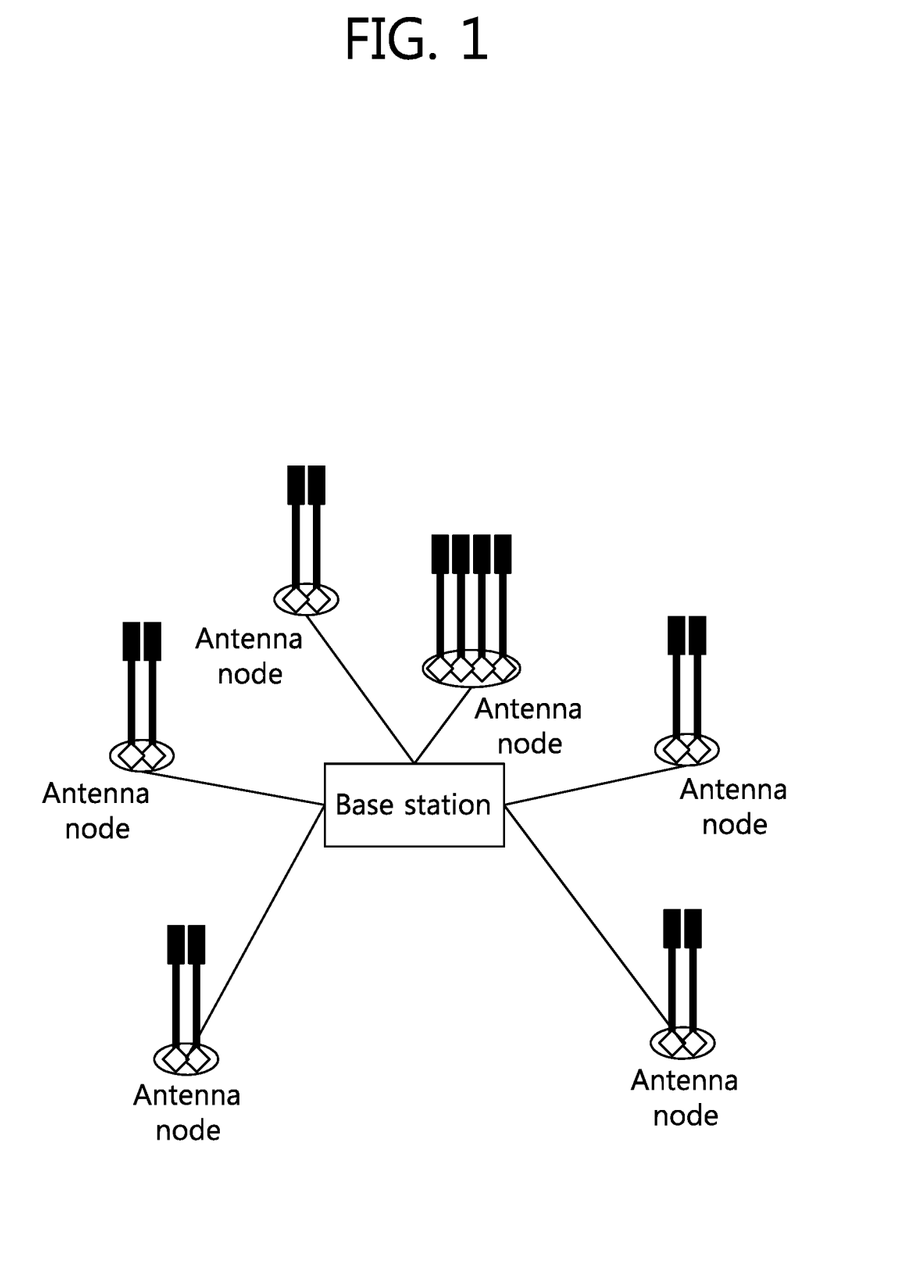
FIG. 1 shows an example of a multi-node system.

FIG. 1 shows an example of a multi-node system.

Referring to FIG. 1, the multi-node system includes a base station (BS) and a plurality of nodes.

The base station provides a communication service in a specific geographical area. The base station typically refers to a fixed station that communicates with a terminal and may be referred to by other terms such as eNB (evolved-NodeB), BTS (Base Transceiver System), or ABS (advanced base station).

The node, in terms of physical meaning, is a device controlled by the base station and may communicate with a terminal. In FIG. 1, as an example of the nodes, distributed antennas are shown, and in such sense, the nodes are denoted as antenna nodes (AN). However, the nodes are not limited to the distributed antennas, and for example, may also be embodied as macro base station antennas, picocell base stations (PeNB), home base stations (HeNB), RRH (remote radio heads), RRU (remote radio units), or relay stations. The nodes are also called points.

A node, in the position of a terminal, may be identified or indicated through a reference signal (RS) or a pilot signal. The reference signal (or pilot signal) is a signal known to a transmission end or a reception end and means a signal used for channel measurement or data demodulation. The reference signal is, for example, CSI-RS (channel status indication-reference signal) specified in the 3GPP LTE-A standards. In an LTE/LTE-A system, one CSI-RS configuration may be mapped to one node. A terminal may identify a node or be instructed based on a CSI-RS according to such CSI-RS configuration and may obtain channel status information for the corresponding node.

As used herein, the term 'node' hereinafter includes a logical node as well as a physical node. The logical node means a node in view of the terminal's recognition. Although the physical node and the logical node may be in the 1:1 correspondence, but are not limited thereto. For example, if multiple physical nodes share one reference signal (pilot) pattern, the multiple physical nodes sharing one reference signal (pilot) pattern may correspond to one logical node.

As an example, in the LTE-A system, one CSI-RS (channel status information reference signal) pattern is defined for one, two, four, or eight transmission antenna ports. Generally, one CSI-RS pattern is transmitted from one physical node. However, if one CSI-RS pattern defined for eight antenna ports is divided and transmitted by two physical nodes each having four transmission antennas, the two physical nodes are recognized by a terminal as one logical node.

Further, in the terminal's position, nodes (physical nodes or logical nodes) are discerned by reference signals (pilot) having different configurations from each other. For example, in the LTE-A system, logical nodes seen in the terminal's position may be distinguished from each other by CSI-RSs having different configurations.

Referring back to FIG. 1, the antenna nodes are connected to the base station wiredly/wirelessly. Each antenna node may be constituted of one antenna or antenna group (i.e., plural antennas). Antennas belonging to one antenna node are positioned geometrically within a few meters and may exhibit the same characteristic. In the multi-node system, an antenna node serves as an access point (AP) to which a terminal may gain access.

As described above, in case a node is constituted of an antenna, the multi-node system is also called a distributed antenna system (DAS). In other words, the distributed antenna system means a system in which antennas (i.e., nodes) are geometrically distributed and arranged at various positions and are managed by a base station. The distributed antenna system differs from the conventional centralized antenna system (CAS) in which a majority of antennas of a base station are arranged at the center of the cell.

The antennas being geometrically distributed and arranged may mean that in case one receiver receives the same signal from a plurality of antennas, the antennas are arranged so that a difference in channel status between each antenna and the receiver is not less than a specific value. A majority of antennas being arranged at the center of the cell may mean that the antennas are densely arranged so that a difference in channel status between each antenna and one receiver is less than a specific value. The specific value may be determined variously depending on frequency or service type used for the antennas.

Figure 2:
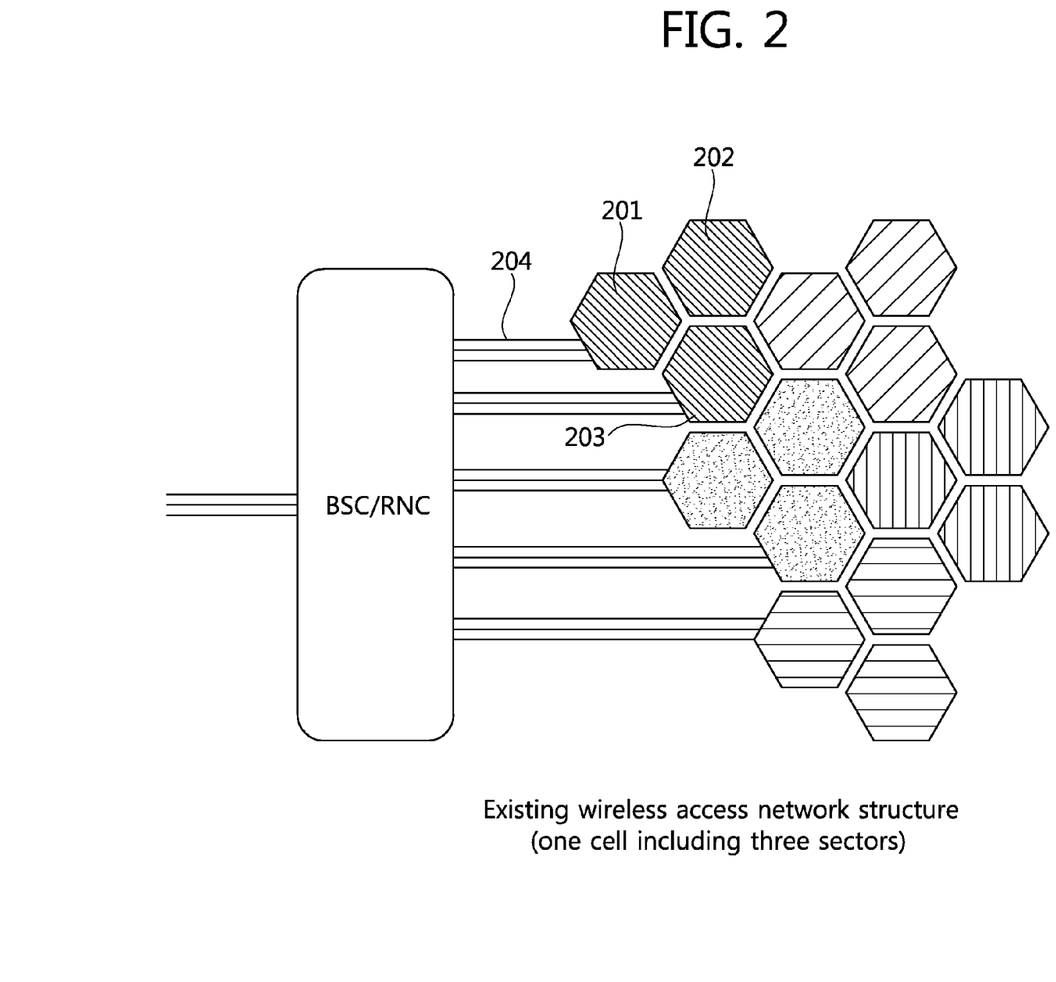
FIG. 2 shows a wireless access structure of a conventional wireless communication system.

FIG. 2 shows a wireless access structure of a conventional wireless communication system.

Referring to FIG. 2, the conventional wireless communication system may be a cellular system. In the cellular system, a base station manages three sectors (e.g., 201, 202, and 203) constituting a cell, and each base station is connected to a base station controller/radio network controller (BSC/RNC) (hereinafter, collectively referred to as BSC) through a backbone network 204. In such conventional wireless communication system, each base station is typically arranged in the cell that the base station is managing.

Figure 3:
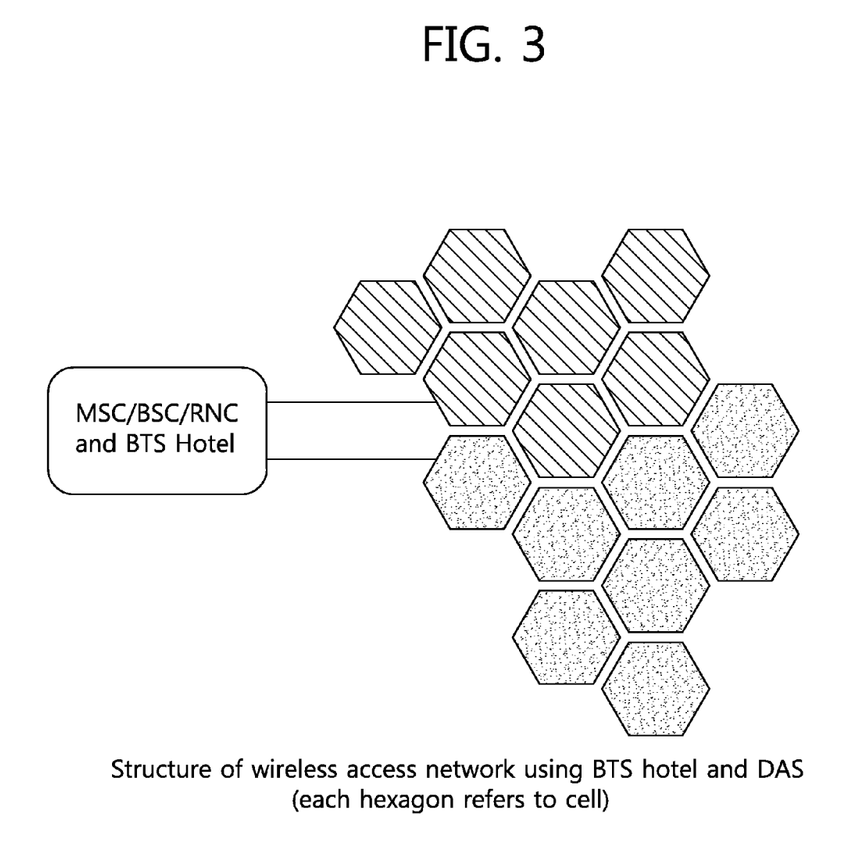
FIG. 3 shows a wireless access structure of a wireless communication system to which the concept of base station hotel applies.

FIG. 3 shows a wireless access structure of a wireless communication system to which the concept of base station hotel applies.

Referring to FIG. 3, base stations (BTSs) may be connected to antenna nodes distributedly arranged in the cells through optical cables, and the base stations (BTSs) are installed in a specific area rather than being arranged in the cells they respectively are managing. As such, collecting, arranging, and managing the plurality of base stations managing the distributed cells in a specific area is referred to as base station (BTS) hotel. According to the concept of base station hotel, expenses for lots or buildings in which base stations are to be installed may be saved, and costs for maintenance/management/repair may be reduced as well. Further, since the base stations, and BSC/RNC are installed in the same area, the backhaul capacity may be increased. The concept of such base station hotel may be applicable to distributed antenna systems.

Figure 4:
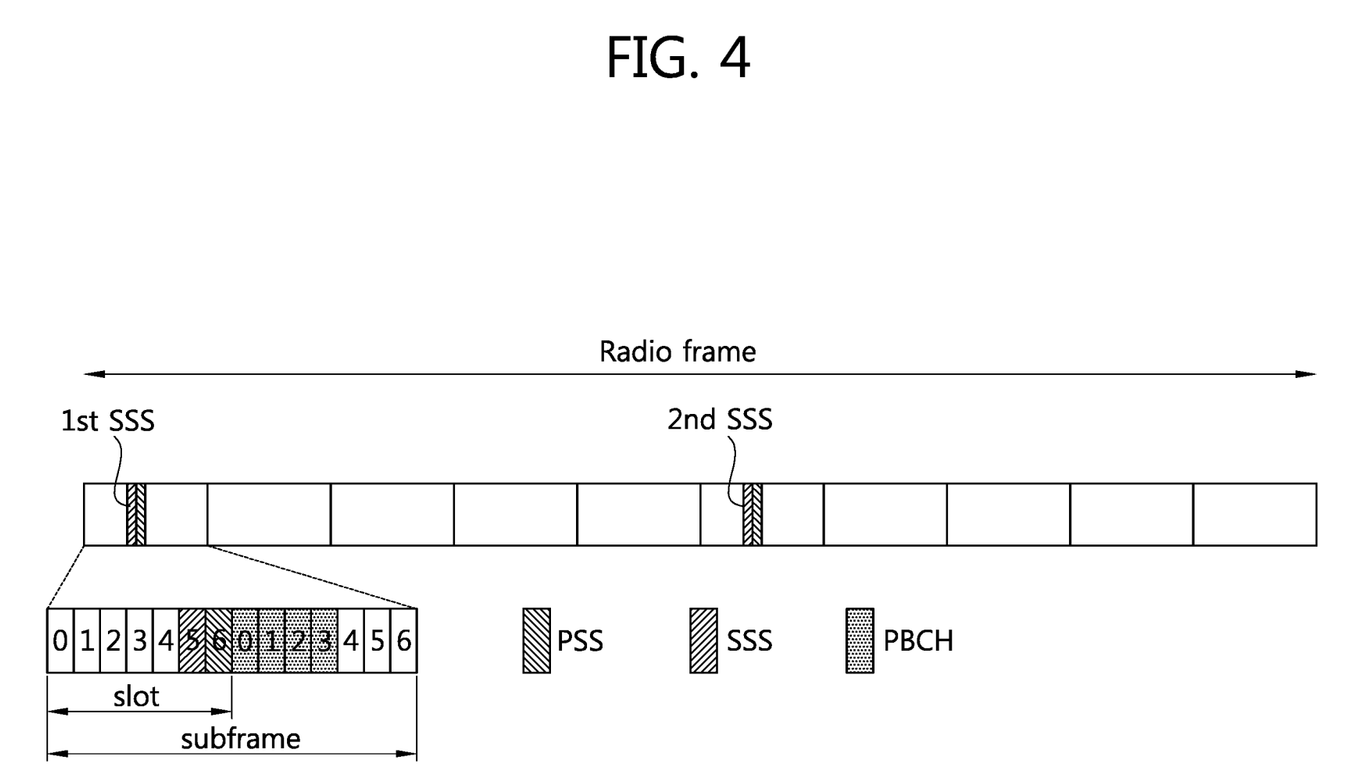
FIG. 4 shows an example of a radio frame structure.

FIG. 4 shows an example of a radio frame structure.

The radio frame consists of ten subframes, and one subframe consists of two slots. Time taken to transmit one subframe is a TTI (transmission time interval). For example, the length of one subframe may be 1 ms, and the length of one slot may be 0.5 ms.

One slot may include a plurality of OFDM (orthogonal frequency division multiplexing) symbols in the time domain. The OFDM symbol is provided to represent one symbol period and may be referred to by other terms according to multiple access scheme. For example, in case SC-FDMA is used as an uplink multiple access scheme, it may be called SC-FDMA symbol. Although one slot includes seven OFDM symbols, for example, the number of OFDM symbols included in one slot may be changed depending on the length of CP (Cyclic Prefix). In the normal CP, one subframe includes seven OFDM symbols, and in the extended CP, one subframe includes six OFDM symbols. The radio frame structure is merely an example, and the number of subframes included in the radio frame and the number of slots included in the subframe may be diversely changed.

A PSS (Primary Synchronization Signal) is transmitted over the last OFDM symbol of the first slot and the eleventh slot in the radio frame. The PSS is used to obtain OFDM symbol sync or slot sync and is associated with a physical cell ID (Identity). A PSC (Primary Synchronization Code) is a sequence used in the PSS, and in the 3GPP LTE system, there are three PSCs, and according to a cell ID, one of the three PSCs is transmitted to the PSS. The same PSC is used for each OFDM symbol of the first and eleventh slots.

An SSS (Secondary Synchronization Signal) includes a first SSS and a second SSS. The first SSS and the second SSS are transmitted over an OFDM symbol adjacent to an OFDM symbol where the PSS is transmitted. The SSS is used to obtain frame sync. The SSS, together with the PSS, is used to obtain a cell ID. The first SSS and the second SSS use different. SSCs (Secondary Synchronization Codes) from each other. When the first SSS and the second SSS each include 31 subcarriers, two SSC with the length of 31 are used in the first SSS and the second SSS, respectively.

A PBCH (Physical Broadcast Channel) is transmitted over four OFDM symbols before the second slot in the first subframe of the radio frame. The PBCH carries system information necessary for a terminal to communicate with a base station, and system information transmitted through the PBCH is called MIB (Master Information Block).

Figure 5:
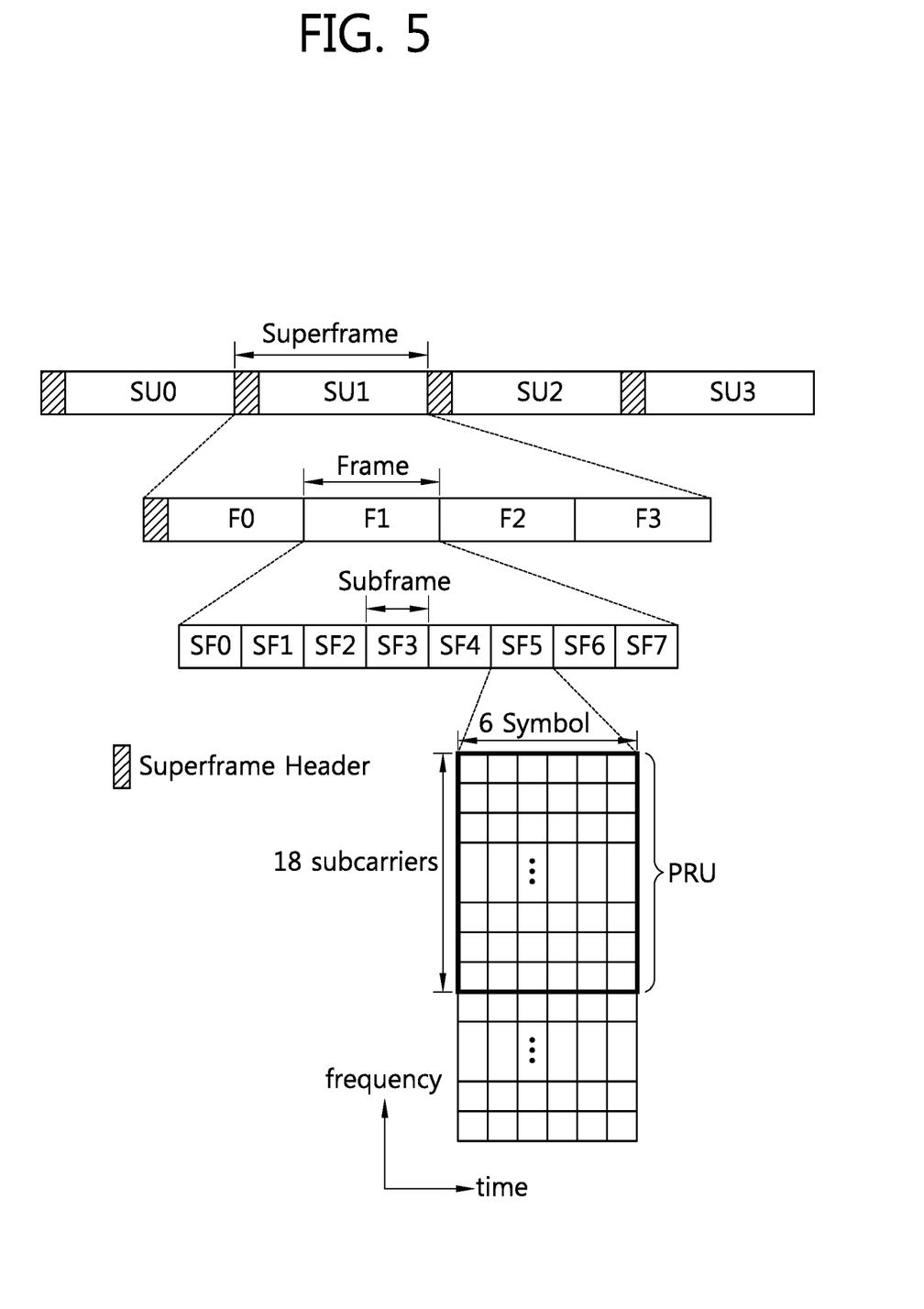
FIG. 5 shows another example of a frame structure.

FIG. 5 shows another example of a frame structure.

Referring to FIG. 5, a superframe (SF) includes a superframe header (SFH) and four frames (F0, F1, F2, F3). The length of each frame in the superframe may be the same. The size of each superframe is 20 ms, and the size of each frame is 5 ms, for example. However, the present invention is not limited thereto. The length of the superframe, the number of frames included in the superframe, and the number of subframes included in each frame may be diversely changed. A frame may include a plurality of subframes. The number of subframes included in a frame may be diversely changed depending on channel bandwidth and length of CP (Cyclic Prepix).

The superframe header may carry essential system parameters and system configuration information. The superframe header may be positioned in the first subframe of the superframe. The superframe header may be classified into primary SFH (P-SFH) and secondary SFH (S-SFH). The P-SFH and the S-SFH may be transmitted for every superframe.

One frame includes multiple subframes (SF0, SF1, SF2, SF3, SF4, SF5, SF6, SF7). Each subframe may be used for uplink or downlink transmission. One subframe includes a plurality of OFDM (orthogonal frequency division multiplexing) symbols in the time domain and a plurality of subcarriers in the frequency domain.

The subframe may consist of 5, 6, 7 or 9 OFDM symbols but this is merely an example. The number of OFDM symbols included in the subframe is not limited thereto. The number of OFDM symbols included in the subframe may be diversely changed depending on channel bandwidth or length of CP.

Hereinafter, a method of transmitting a signal in a multi-node system according to an embodiment of the present invention is described.

Figure 6:
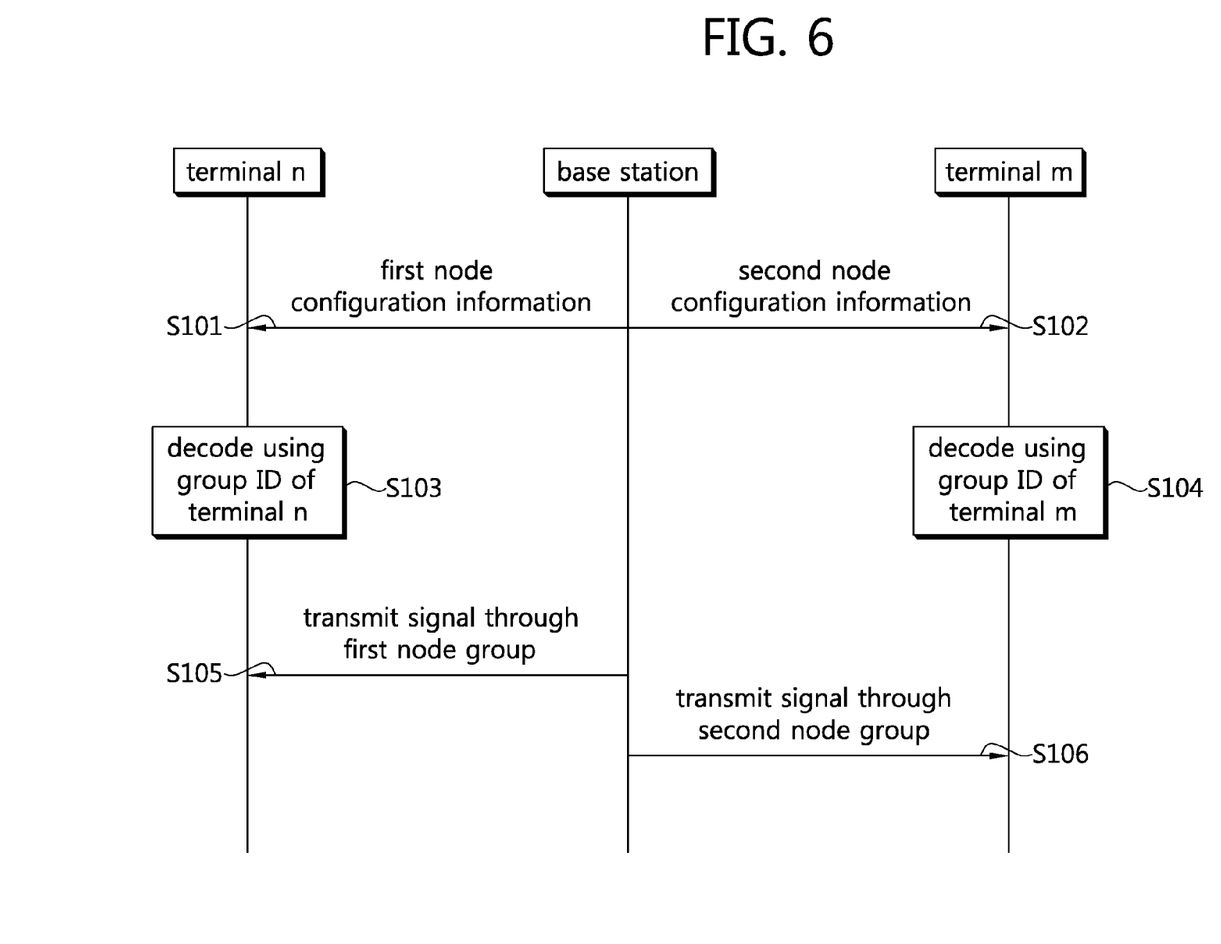
FIG. 6 shows an example of a method of transmitting a signal in a multi-node system.

FIG. 6 shows an example of a method of transmitting a signal in a multi-node system.

In FIG. 6, the base station controls a plurality of nodes arranged in the cell, and terminal n and terminal m may be terminals arranged in the cell where the base station provides services. Accordingly, terminals n and m are terminals using the same cell ID. However, terminal n and terminal m may be included in different terminal groups and included in different classes. If a terminal is included in a specific terminal group, the corresponding terminal may be assigned a terminal group ID. Further, if a terminal is included in a specific class, the corresponding terminal may be assigned a class ID. Classes may be divided depending on data rate required by a terminal, QoS (Quality of Service), fee plan, or transmission standards (e.g., LTE/LTE-A, IEEE802.16e/IEEE 802.16m).

Referring to FIG. 6, the base station transmits first node configuration information to terminal n (S101) and transmits second node configuration information to terminal m (S102). In other words, the base station sends corresponding node configuration information to each terminal.

The node configuration information includes information on the system configuration. For example, fields included in the node configuration information may include 1. total number of nodes in the cell, 2. Number of transmission antennas of each node, 3. Transmission power of each node, and 4. Mapping information between reference signal configuration and node. At this time, the node configuration information transmitted to terminals different from each other may have field values set different from each other. For example, the field value indicating the total number of nodes in the cell as included in the first node configuration information may be set different from the field value indicating the total number of nodes in the cell as included in the second node configuration information. Other field values may be set to have different values in the same way.

In the existing wireless communication system, the same system parameter is transmitted to all the terminals in the cell, and as a result, all the terminals in the cell commonly recognize the transmission antenna configuration in the cell. On the contrary, according to the present invention, a different system parameter may be transmitted to each of the terminals in the cell through the node configuration information, and resultantly, a different transmission antenna configuration in the cell may be recognized by each terminal.

The first node configuration information and the second node configuration information may be transmitted through broadcast channels such as PBCH and SFH. Or, the first node configuration information and the second node configuration information may be included in a higher layer signal, e.g., RRC (Radio Resource Control) message transmitted through a data channel such as PDSCH (Physical Downlink Shared Channel). That is, the node configuration information may be transmitted through a broadcast message or through a multicast or unicast message.

The node configuration information may be periodically or aperiodically transmitted.

The first node configuration information is transmitted while masked with a group ID of the terminal group to which terminal n belongs. Further, the second node configuration information may be transmitted while masked with a group ID of a terminal group to which terminal m belongs.

Terminal n decodes the first node configuration information using the group ID to which terminal n belongs (S103). That is, terminal n may decode the first node configuration information by de-masking the first node configuration information with the group ID of the group to which terminal n belongs.

Terminal m decodes the second node configuration information using the group ID to which terminal m belongs (S103). That is, terminal m may decode the second node configuration information by de-masking the second node configuration information with the group ID of the group to which terminal m belongs.

As such, the base station masks the group ID of a specific terminal and transmits the node configuration information, and only the terminal having the specific group ID may successfully decode the corresponding node configuration information.

The base station transmits a signal to terminal n through a first node group (S105). Here, the first node group may be nodes indicated by the first node configuration information.

The base station transmits a signal to terminal m through a second node group (S106). The second node group may be nodes indicated by the second node configuration information.

Although an example in which node configuration information is masked and de-masked with a group ID of a terminal has been described above in connection with FIG. 6, the present invention is not limited thereto. In other words, the node configuration information may be also masked and de-masked with a class ID of the terminal.

Figure 7:
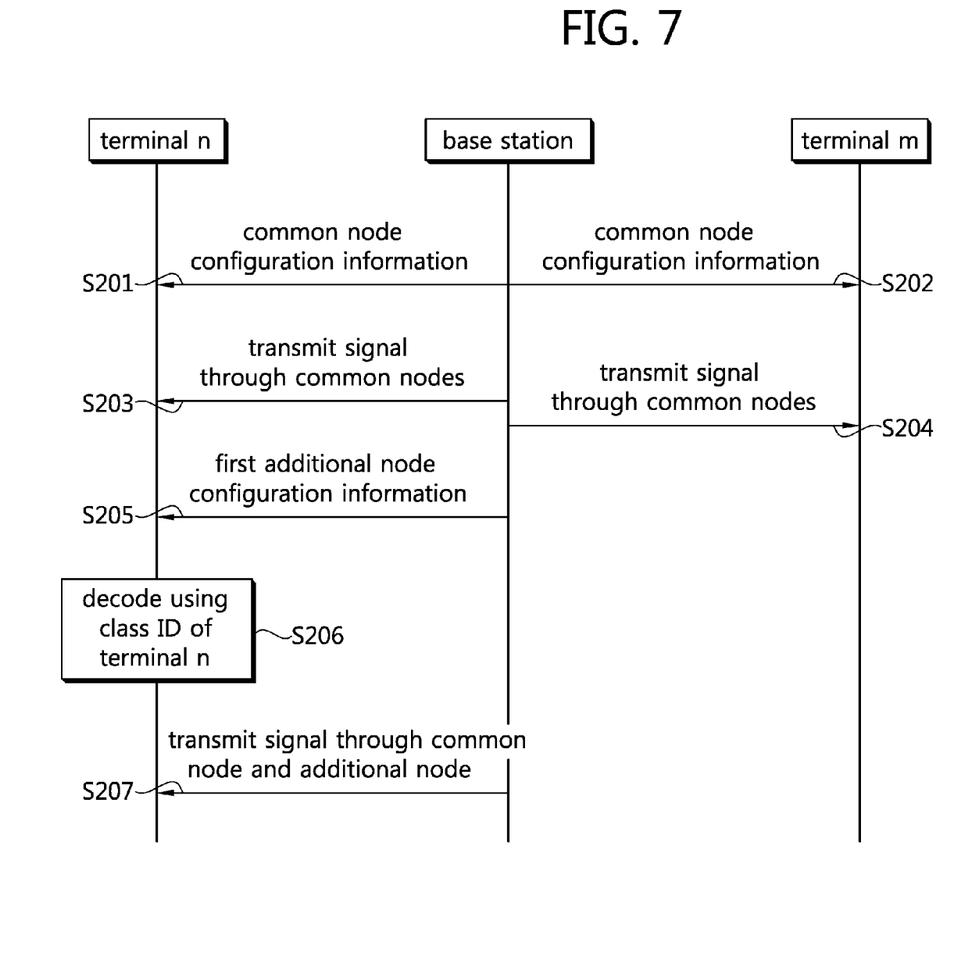
FIG. 7 shows another example of a method of transmitting a signal in a multi-node system.

FIG. 7 shows another example of a method of transmitting a signal in a multi-node system.

Referring to FIG. 7, the base station transmits common node configuration information to terminal n and terminal m (S201, S202). The common node configuration information may include system information common to all the terminals in the cell. The common system information may be generated using a cell ID common to all the terminals. For example, the common node configuration information may include the total number of nodes in the cell, number of transmission antennas of each node, and mapping information between the reference signal configuration and nodes. The common node configuration information may be transmitted through a predetermined node (this is referred to as a common node or reference node). The common node may be a node that performs initial operations such as cell entry or cell re-entry of a terminal.

The base station transmits a signal through the common node to terminal n and terminal m (S203, S204). The common node configuration information may be broadcast through PBCH, PDSCH (Physical Downlink Shared Channel) or SFH.

The base station transmits first additional node configuration information to terminal n (S205). The first additional node configuration information may indicate a node that is added or changed (including removing) specifically to terminal n according to the terminal group or class to which terminal n belongs. The first additional node configuration information may be generated based on the group ID or class ID of the terminal group to which terminal n belongs. The first additional node configuration information may be transferred in the form of a higher layer message or terminal-specific triggering signal.

Terminal n decodes the first additional node configuration information using the class ID (S206). The first additional node configuration information may be implemented in the form of, e.g., bitmap. Assume that the total number of nodes in the cell as indicated by the common node configuration information is 10 (node #1 to node #10), and the number of common nodes is six (node #1 to node #6). In such case, the first additional node configuration information may be configured as a 10-bit bitmap, and the respective bits may sequentially correspond to nodes #1 to #10. The first additional node configuration information may be scrambled or masked with the class ID of terminal n. Terminal n may interpret a node corresponding to a bit with a bit value of 1 as the node added to terminal n in the bitmap descrambled or de-masked with the class ID. For example, if a bitmap '0000001010' is decoded, the terminal may interpret it as nodes #7 and #9 being added. That is, nodes #7 and #9 are additional nodes.

The base station transmits a signal to terminal n through the common and additional nodes (S207). Here, the additional nodes may be at least one node indicated by the first additional node configuration information.

Assume that terminal n has a fee plan higher than those of the other terminals in the cell. Then, more nodes may be allocated to terminal n to provide a better quality of service. For this purpose, allocating additional nodes is known to terminal n through the first additional node configuration information.

Figure 8:
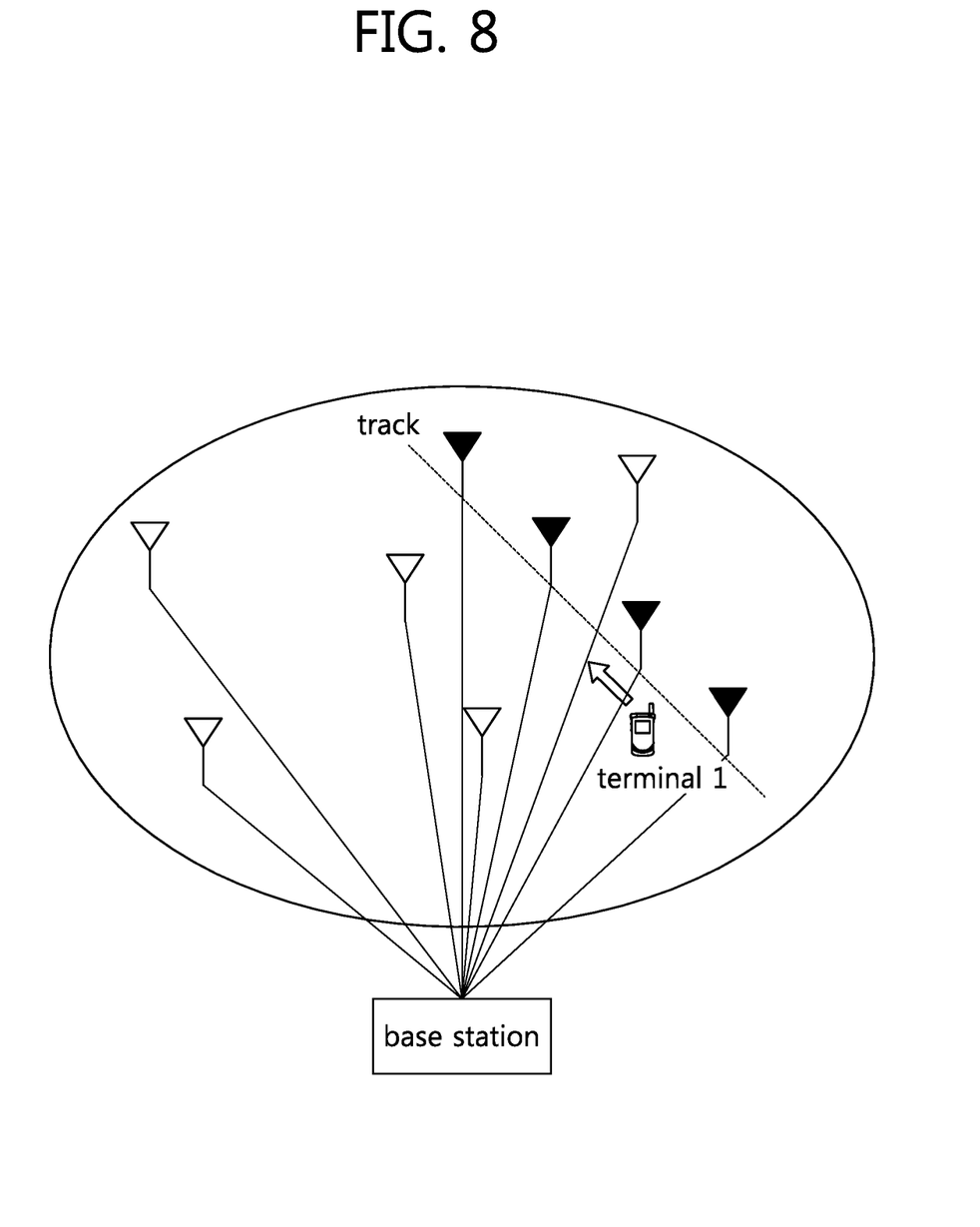
FIG. 8 shows an example of applying the method described above in connection with FIG. 6.

FIG. 8 shows an example of applying the method described above in connection with FIG. 6.

Referring to FIG. 8, terminal 1 travels at high speed along a specific path in a service area of the base station. For example, terminal 1 may be a terminal moving fast along a highway or track. It is preferable that such terminal recognizes only the nodes positioned around the specific path as being present in the service area of the base station. Accordingly, in the example illustrated in FIG. 8, the base station may provide terminal 1 with 1. The total number of nodes in the cell, which is 4, 2. Number of transmission antennas of each node, 3. Transmission power of each of the four nodes, and 4. Mapping information between a reference signal configuration and four nodes.

A terminal moving at low speed may also be present in the service area of the base station. For example, a terminal of a user who walks in a downtown may be provided. The base station may provide this terminal with the total number of nodes in the cell, which is five (five nodes except for the four nodes positioned around the specific path), number of transmission antennas for the five nodes, transmission power, and mapping information between the reference signal configuration and nodes.

Figure 9:
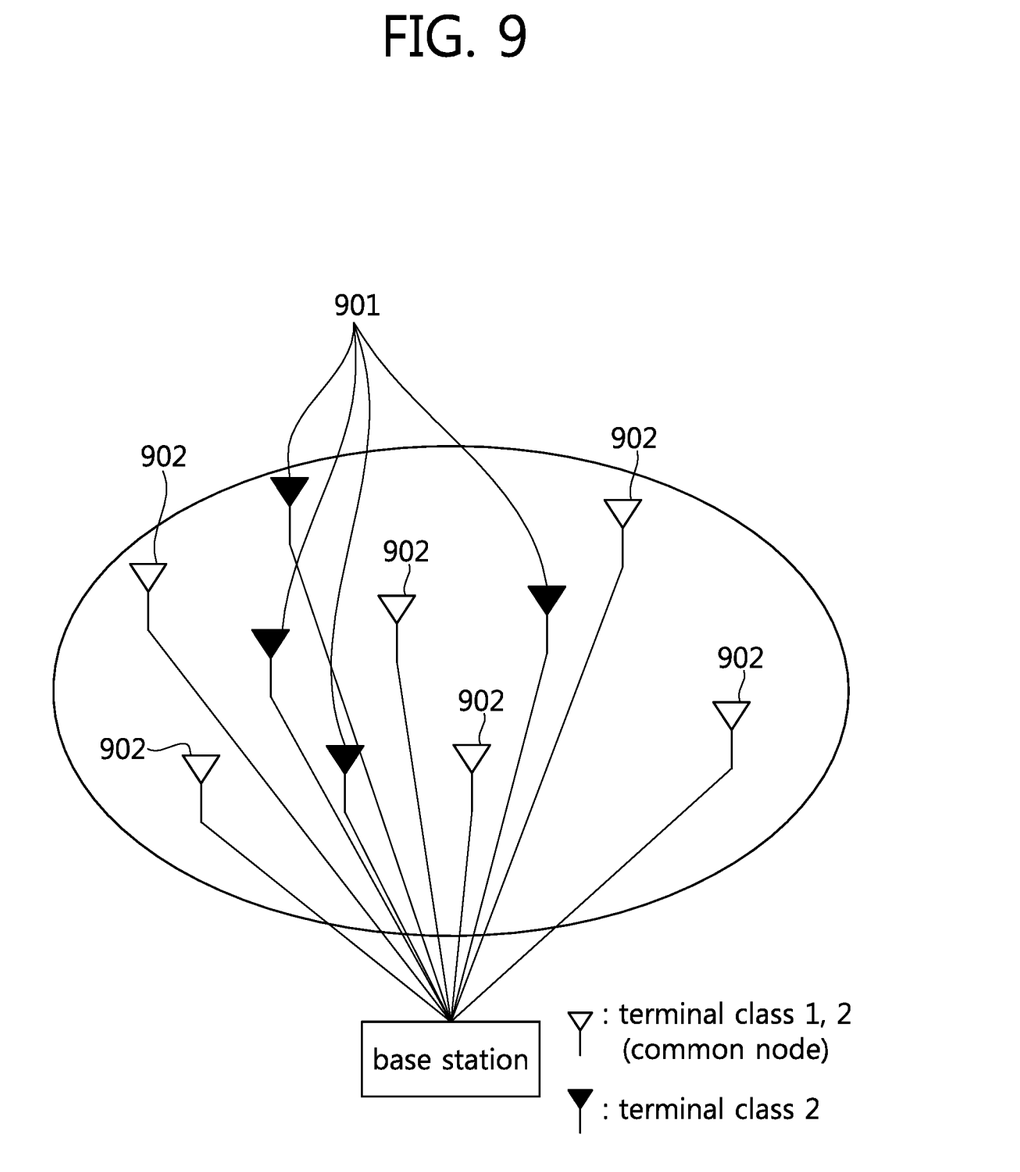
FIG. 9 shows an example of applying the method described above in connection with FIG. 7.

FIG. 9 shows an example of applying the method described above in connection with FIG. 7.

Referring to FIG. 9, terminals in the service area of the base station may be assigned different numbers of nodes according to the class. For example, an LTE-A terminal may be class 1, and an LTE terminal may be class 2. Of course, terminals may have different classes depending on the amount of data demanded or fee plans.

As such, in case a different class is assigned to each terminal in the service area, the base station provides some services such as terminal's entry or re-entry into cell irrespective of the class of the terminals through a common node 902 and may assign an additional node 901 to terminals having a specific class to support the terminals. For example, the base station may additively assign four more nodes to an LTE-A terminal through the additional node configuration information so that services may be provided through a total of ten nodes while an LTE terminal may provide services through only six common nodes. Of course, the nodes to be assigned to the terminal may be varied by changing the class of the terminal or in response to a request.

Figure 10:
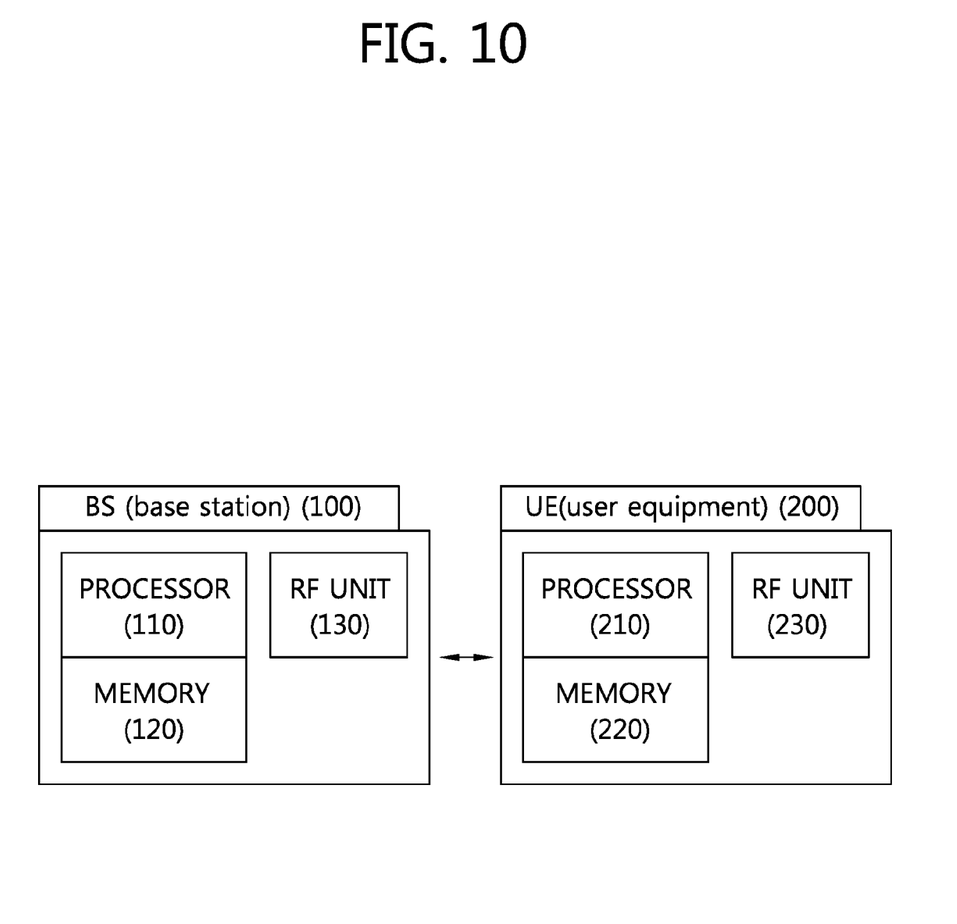
FIG. 10 is a block diagram illustrating a base station and a terminal.

FIG. 10 is a block diagram illustrating a base station and a terminal.

The base station 100 includes a processor 110, a memory 120, and an RF (radio frequency) unit 130. The processor 110 implements suggested functions, procedures, and/or methods. For example, the processor 110 may be connected to and control a plurality of nodes distributed and arranged in a multi-node system. The processor 110 transmits node configuration information to the terminal and transmits a signal through a node group indicated by the node configuration information. The node configuration information may include system parameters that are set differently to each terminal. Further, the processor 110 may assign additional nodes to the terminal through additional node configuration information and may support the terminal. The memory 120 is connected to the processor 110 and stores various pieces of information for driving the processor 110. The RF unit 130 is connected to the processor 110 and transmits and/or receives wireless signals.

The terminal 200 includes a processor 210, a memory 220, and an RF unit 230. The processor 210 implements suggested functions, procedures, and/or methods. For example, the processor 210 receives node configuration information and additional node configuration information from the base station, de-masks and decodes it with a group ID or class ID of the group to which the terminal belongs, and then receives a signal through a node indicated thereby. The memory 220 is connected to the processor 210 and stores various pieces of information for driving the processor 210. The RF unit 230 is connected to the processor 210 and transmits and/or receives wireless signals.

The processor 110 or 210 may include an ASIC (application-specific integrated circuit), other chipsets, a logic circuit, a data processing device and/or a converter for mutually converting a baseband signal and a wireless signal. The memory 120 or 220 may include a ROM (read-only memory), a RAM (random access memory), a flash memory, a memory card, a storage medium, and/or other storage devices. The RF unit 130 or 230 may include one or more antennas for transmitting and/or receiving wireless signals. When the embodiments are implemented in software, the above-described schemes may be embodied in modules (procedures or functions) for performing the above-described functions. The modules may be stored in the memory 120 or 220 and may be executed by the processor 110 or 210. The memory 120 or 220 may be positioned in or outside the processor 110 or 210 and may be connected to the processor 110 or 210 via a well-known means.

The present invention may be implemented in hardware, software, or a combination thereof. A hardware implementation may be realized in an ASIC (application specific integrated circuit), a DSP (digital signal processing), a PLD (programmable logic device), a FPGA (field programmable gate array), a processor, a controller, a microprocessor, other electronic unit or a combination thereof as designed to perform the above-described functions. A software implementation may be realized in a module for performing the above-described functions. The software may be stored in a memory unit and may be executed by a processor. The memory unit or the processor may adopt various means well known to those of ordinary skill.

Although preferred embodiments have been described, it may be understood by those of ordinary skill that various modifications and variations may be made thereto without departing from the scope and spirit of the present invention.

The invention claimed is:

1. A method of transmitting a signal in a multi-node system including a plurality of nodes and a base station connected to each of the plurality of nodes and controlling the plurality of nodes, the method comprising:

transmitting first node configuration information to a first terminal;

transmitting second node configuration information to a second terminal;

transmitting a signal to the first terminal through a first node group; and transmitting a signal to a second terminal through a second node group, wherein the first node configuration information and the second node configuration information include system parameters set to be different from each other according to a terminal, and wherein the first node group is determined based on the first node configuration information, and the second node group is determined based on the second node configuration information, wherein the first terminal and the second terminal have group Identifications (IDs) or class IDs different from each other, and wherein the class IDs are set differently depending on a quality of service required by the first terminal and the second terminal.

2. The method of claim 1, wherein the first node group and the second node group use the same cell ID.

3. The method of claim 1, wherein the first node configuration information includes at least one of fields applicable to the first terminal, the fields respectively indicating the number of nodes, the number of transmission antennas per node, transmission power per node, and mapping information between a node and a reference signal.

4. The method of claim 1, wherein the second node configuration information includes at least one of fields applicable to the second terminal, the fields respectively indicating the number of nodes, the number of transmission antennas per node, transmission power per node, and mapping information between a node and a reference signal.

5. The method of claim 1, wherein the first node configuration information and the second node configuration information are masked with the group IDs or class IDs of the first and second terminals and transmitted.

6. A method of transmitting a signal in a multi-node system including a plurality of nodes and a base station connected to each of the plurality of nodes and controlling the plurality of nodes, the method comprising:

transmitting common node configuration information to a first terminal and a second terminal;

transmitting a signal to the first terminal and the second terminal through a common node indicated by the common node configuration information;

transmitting first additional node configuration information to the first terminal; and transmitting a signal to the first terminal through the common node and an additional node indicated the first additional node configuration information, wherein the first terminal and the second terminal have group Identifications (IDs) or class IDs different from each other, and wherein the class IDs are set differently depending on a quality of service required by the first terminal and the second terminal.

7. The method of claim 6, wherein the common node is a node transmitting a signal necessary for the first terminal and the second terminal to enter or re-enter into a cell.

8. The method of claim 7, wherein common nodes are some of the plurality of nodes.

9. The method of claim 6, wherein the first additional node configuration information includes a bitmap indicating a node that is added to the first terminal among the plurality of nodes.

10. The method of claim 6, wherein the common node configuration information is transmitted through a broadcast channel.

11. The method of claim 6, wherein the first additional node configuration information is unicast to the first terminal.

12. The method of claim 6, wherein the first additional node configuration information is masked with a terminal group ID or class ID of the first terminal and transmitted.

* * * * *